(12) United States Patent
Sun

(10) Patent No.: US 12,253,682 B1
(45) Date of Patent: Mar. 18, 2025

(54) AUGMENTED REALITY DISPLAY DEVICE

(71) Applicants: Interface Optoelectronics (ShenZhen) Co., Ltd., Guangdong (CN); Interface Technology (ChengDu) Co., Ltd., Sichuan (CN); General Interface Solution Limited, Miaoli County (TW)

(72) Inventor: Bo-Jhang Sun, Guangdong (CN)

(73) Assignees: Interface Optoelectronics (ShenZhen) Co., Ltd., Guangdong (CN); Interface Technology (ChengDu) Co., Ltd., Sichuan (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/430,610

(22) Filed: Feb. 1, 2024

(30) Foreign Application Priority Data

Oct. 25, 2023 (CN) .......................... 202311396419.9

(51) Int. Cl.
  *G02B 27/01* (2006.01)
  *G02C 11/00* (2006.01)
  *H02S 40/38* (2014.01)

(52) U.S. Cl.
  CPC .. *G02B 27/0176* (2013.01); *G02B 2027/0178* (2013.01); *G02C 11/10* (2013.01); *H02J 2300/22* (2020.01); *H02S 40/38* (2014.12)

(58) Field of Classification Search
  CPC ...... G06F 3/011; H02S 40/38; H02J 2300/22; G02B 2027/0178; G02C 11/10
  See application file for complete search history.

(56) References Cited

U.S. PATENT DOCUMENTS

2009/0251660 A1* 10/2009 Figler ................ G02F 1/13452
                                                       351/158
2017/0115742 A1   4/2017 Xing et al.

FOREIGN PATENT DOCUMENTS

| CN | 1677790 B    | 9/2014 |
| CN | 105429262 A  | 3/2016 |
| CN | 208939645 U  | 6/2019 |
| CN | 211236481 U  | 8/2020 |
| CN | 213182200 U  | 5/2021 |
| CN | 113934014 A  | 1/2022 |
| JP | 5190070 B2   | 4/2013 |
| TW | I689751 B    | 4/2020 |

\* cited by examiner

*Primary Examiner* — Kevin M Nguyen
(74) *Attorney, Agent, or Firm* — CKC & Partners Co., LLC

(57) ABSTRACT

An augmented reality display device includes an eyeglass frame and a solar charging plate. The eyeglass frame has at least a first electrode, at least a second electrode and a battery, in which the first electrode and the second electrode electrically connect the battery respectively through conductive wires. The solar charging plate is detachably located on the eyeglass frame and has at least a third electrode and at least a fourth electrode, in which the third electrode magnetically attaches and electrically connects the first electrode, the fourth electrode magnetically attaches and electrically connects the second electrode. The solar charging plate is configured to charge the battery.

20 Claims, 6 Drawing Sheets

AUGMENTED REALITY DISPLAY DEVICE

RELATED APPLICATIONS

This application claims priority to China Application Serial Number 202311396419.9, filed Oct. 25, 2023, which is herein incorporated by reference.

BACKGROUND

Field of Disclosure

The present disclosure relates to an augmented reality display device.

Description of Related Art

As the progress of technology, the application of augmented reality (AR) glasses has been more extensive. The AR glasses on the market mainly consist of a light source and a waveguide module, which display an image through the projection of the image from the light source. However, since the AR glasses are wearable devices, the size of the battery cannot be extended, which limits the using time of the AR glasses after fully charged.

SUMMARY

One aspect of the present disclosure provides an augmented reality display device.

According to some embodiments of the present disclosure, an augmented reality display device includes an eyeglass frame and a solar charging plate. The eyeglass frame has at least a first electrode, at least a second electrode and a battery, in which the first electrode and the second electrode electrically connect the battery respectively through conductive wires. The solar charging plate is detachably located on the eyeglass frame and has at least a third electrode and at least a fourth electrode, in which the third electrode magnetically attaches and electrically connects the first electrode, the fourth electrode magnetically attaches and electrically connects the second electrode. The solar charging plate is configured to charge the battery.

In some embodiments of the present disclosure, the solar charging plate includes a lens holder and two lenses. The two lenses are fastened to the lens holder, in which the third electrode and the fourth electrode are located on a side facing the eyeglass frame of the lens holder.

In some embodiments of the present disclosure, the eyeglass frame further includes a waveguide plate. The waveguide plate is located on a surface facing away the first electrode and the second electrode of the eyeglass frame.

In some embodiments of the present disclosure, an amount of the first electrode is two, an amount of the second electrode is two, an amount of the third electrode is two, an amount of the fourth electrode is two, the two third electrodes are located at two opposite edges of the solar charging plate, the two first electrodes are located at two opposite edges of the eyeglass frame.

In some embodiments of the present disclosure, an amount of the first electrode is two, an amount of the second electrode is two, an amount of the third electrode is two, an amount of the fourth electrode is two, one of the two third electrodes and one of the two fourth electrodes are located at two opposite edges of the solar charging plate, one of the two first electrodes and one of the two second electrodes are located at two opposite edges of the eyeglass frame.

In some embodiments of the present disclosure, the first electrode electrically connects a positive electrode of the battery.

In some embodiments of the present disclosure, the second electrode electrically connects a negative electrode of the battery.

Another aspect of the present disclosure provides an augmented reality display device.

According to one embodiment of the present disclosure, an augmented reality display device includes an eyeglass frame and a solar charging plate. The eyeglass frame has a first electrode, a second electrode and a battery, in which the first electrode and the second electrode electrically connect the battery respectively through conductive wires. The solar charging plate has at least a third electrode, at least a fourth electrode and two magnetic points, in which one of the two magnetic points magnetically attaches and electrically connects the first electrode, the other of the two magnetic points magnetically attaches and electrically connects the second electrode. The third electrode electrically connects the first electrode. The fourth electrode electrically connects the second electrode. The solar charging plate is configured to charge the battery.

In some embodiments of the present disclosure, one of the two magnetic points electrically connects the third electrode, the other of the two magnetic points electrically connects the fourth electrode.

In some embodiments of the present disclosure, the two magnetic points are located at two opposite sides of the solar charging plate.

In some embodiments of the present disclosure, the solar charging plate includes a lens holder and two lenses. The two lenses are fastened to the lens holder, in which the third electrode and the fourth electrode are located on a side facing the eyeglass frame of the lens holder of the eyeglass frame.

In some embodiments of the present disclosure, the eyeglass frame further includes a waveguide plate. The waveguide plate is located on a surface facing away the first electrode and the second electrode.

In some embodiments of the present disclosure, an amount of the third electrode is two, an amount of the fourth electrode is two, and the third electrodes are located at two opposite sides of the solar charging plate.

In some embodiments of the present disclosure, an amount of the third electrode is two, an amount of the fourth electrode is two, and one of the third electrodes and one of the fourth electrodes are located at two opposite sides of the solar charging plate.

In some embodiments of the present disclosure, the first electrode electrically connects a positive electrode of the battery, the second electrode electrically connects a negative electrode of the battery.

Another aspect of the present disclosure provides an augmented reality display device.

According to one embodiment of the present disclosure, an augmented reality display device includes an eyeglass frame and a solar charging plate. The eyeglass frame has a first electrode, a second electrode and a battery, in which the first electrode and the second electrode electrically connect the battery respectively through conductive wires. The first electrode and the second electrode are located at two opposite sides of the eyeglass frame. The solar charging plate has a third electrode and a fourth electrode, in which the third electrode magnetically attaches and electrically connects the first electrode, the fourth electrode magnetically attaches and electrically connects the second electrode, and the solar charging plate is configured to charge the battery.

In some embodiments of the present disclosure, the third electrode and the fourth electrode are located at two opposite sides of the solar charging plate.

In some embodiments of the present disclosure, the eyeglass frame further includes a waveguide plate. The waveguide plate is located on a surface facing away the first electrode and the second electrode of the eyeglass frame.

In some embodiments of the present disclosure, the first electrode electrically connects a positive electrode of the battery.

In some embodiments of the present disclosure, the second electrode electrically connects a negative electrode of the battery.

In the aforementioned embodiments of the present disclosure, since the solar charging plate is disposed at the outmost of the augmented reality display device, the solar charging plate can charge the battery in the eyeglass frame through external light such as sunlight, and thus achieve the effect of extending the using time of the battery and reducing the weight of the charging device, which improves the competitiveness of the product.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
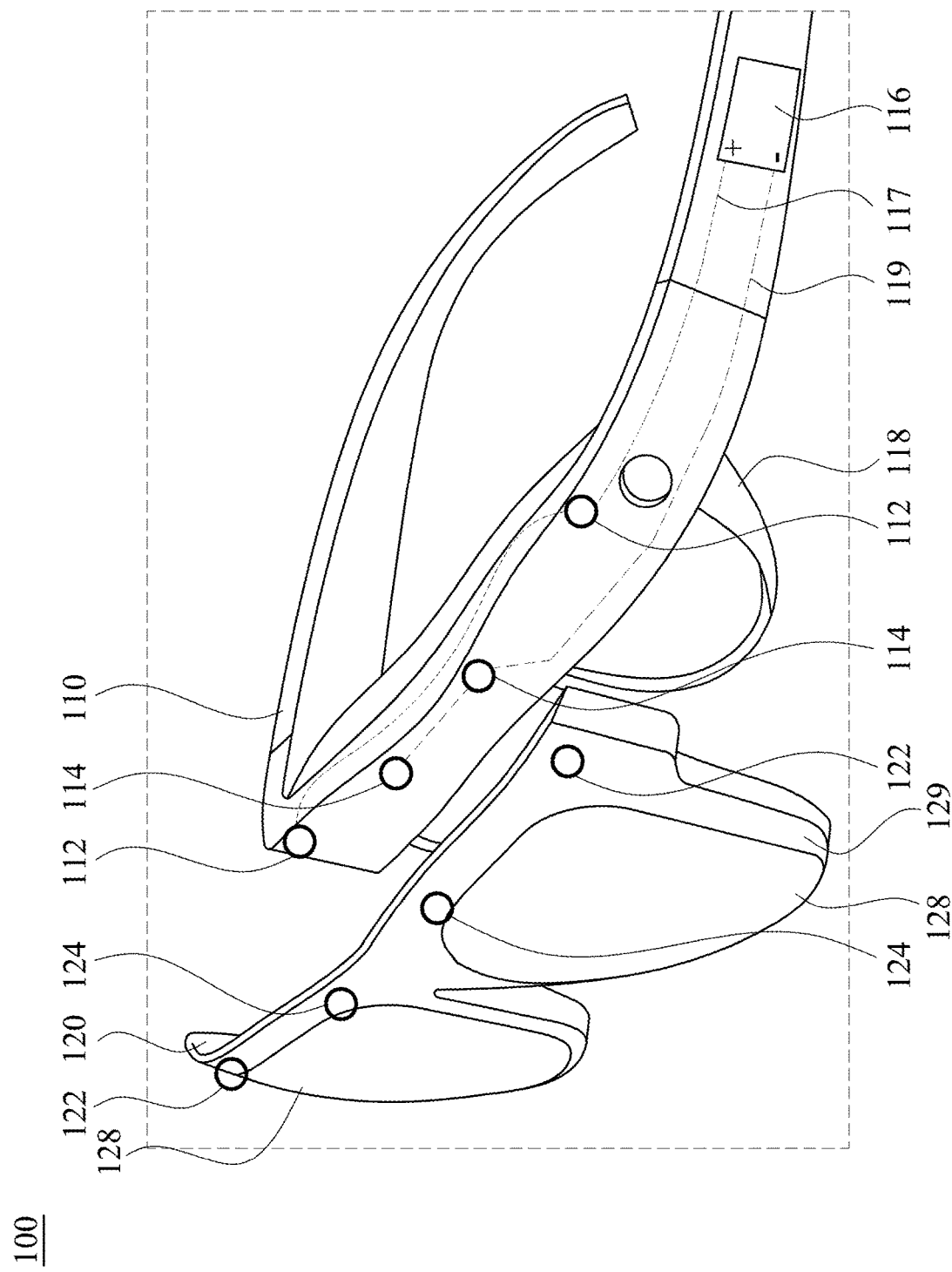
FIG. 1 is a stereogram of an augmented reality display device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a stereogram of an augmented reality display device 100 according to one embodiment of the present disclosure. Refer to FIG. 1, an augmented reality display device 100 includes an eyeglass frame 110 and a solar charging plate 120, and the solar charging plate 120 can be assembled to the eyeglass frame 110. The eyeglass frame 110 has at least a first electrode 112, at least a second electrode 114 and a battery 116, in which the first electrode 112 and the second electrode 114 electrically connect the battery 116 respectively through conductive wires 117, 119. In the present embodiment, an amount of the first electrode 112 is two, an amount of the second electrode 114 is two. The two first electrodes 112 are located at two opposite edges of the eyeglass frame 110. The two second electrodes 114 are located at a position close to the center of the eyeglass frame 110. The solar charging plate 120 is detachably located on the eyeglass frame 110 and has at least a third electrode 122 and at least a fourth electrode 124. When the solar charging plate 120 is assembled to the eyeglass frame 110, the third electrode 122 magnetically attaches and electrically connects the first electrode 112, the fourth electrode 124 magnetically attaches and electrically connects the second electrode 114. Moreover, the solar charging plate 120 is configured to charge the battery 116. In the present embodiment, an amount of the third electrode 122 is two, an amount of the fourth electrode 124 is two. The two third electrodes 122 are located at two opposite edges of the solar charging plate 120. The two fourth electrodes 124 are located at a position close to the center of the solar charging plate 120. In the present embodiment, the first electrodes 112 electrically connect the positive electrode of the battery 116, the second electrodes 114 electrically connect the negative electrode of the battery 116.

In particular, when the solar charging plate 120 is irradiated, the active layer in the solar charging plate 120 will generate electron-hole pairs, and thus generate a voltage in the circuit since the electrons and the holes drift to the cathode (the fourth electrode 124 in the present embodiment) and anode (the third electrode 122 in the present embodiment) respectively, which can be equivalent to a battery, and can have the effect of electricity generation. At this time, sine the solar charging plate 120 electrically connects to the battery 116 through the first electrode 112, the second electrode 114, the third electrode 122 and the fourth electrode 124, the solar charging plate 120 can be used to charge the battery 116. In the present embodiment, the first electrode 112, the second electrode 114, the third electrode 122 and the fourth electrode 124 are simultaneously an electrode and a magnetic field generating point, which can charge the battery 116 through inducing magnetic field.

Since the solar charging plate 120 is disposed at the outmost of the augmented reality display device 100, the solar charging plate 120 can charge the battery 116 in the eyeglass frame 110 through external light such as sunlight, and thus achieve the effect of extending the using time of the battery 116 and reducing the weight of the charging device, which improves the competitiveness of the product.

In the present embodiment, the solar charging plate 120 further includes a lens holder 129 and two lenses 128. The two lenses 128 are fastened to the lens holder 129, in which the third electrode 122 and the fourth electrode 124 are located on a side facing the eyeglass frame 110 of the lens holder 129. The eyeglass frame 110 further includes a waveguide plate 118. The waveguide plate 118 is located on a surface facing away the first electrode 112 and the second electrode 114 of the eyeglass frame 110.

Figure 2:
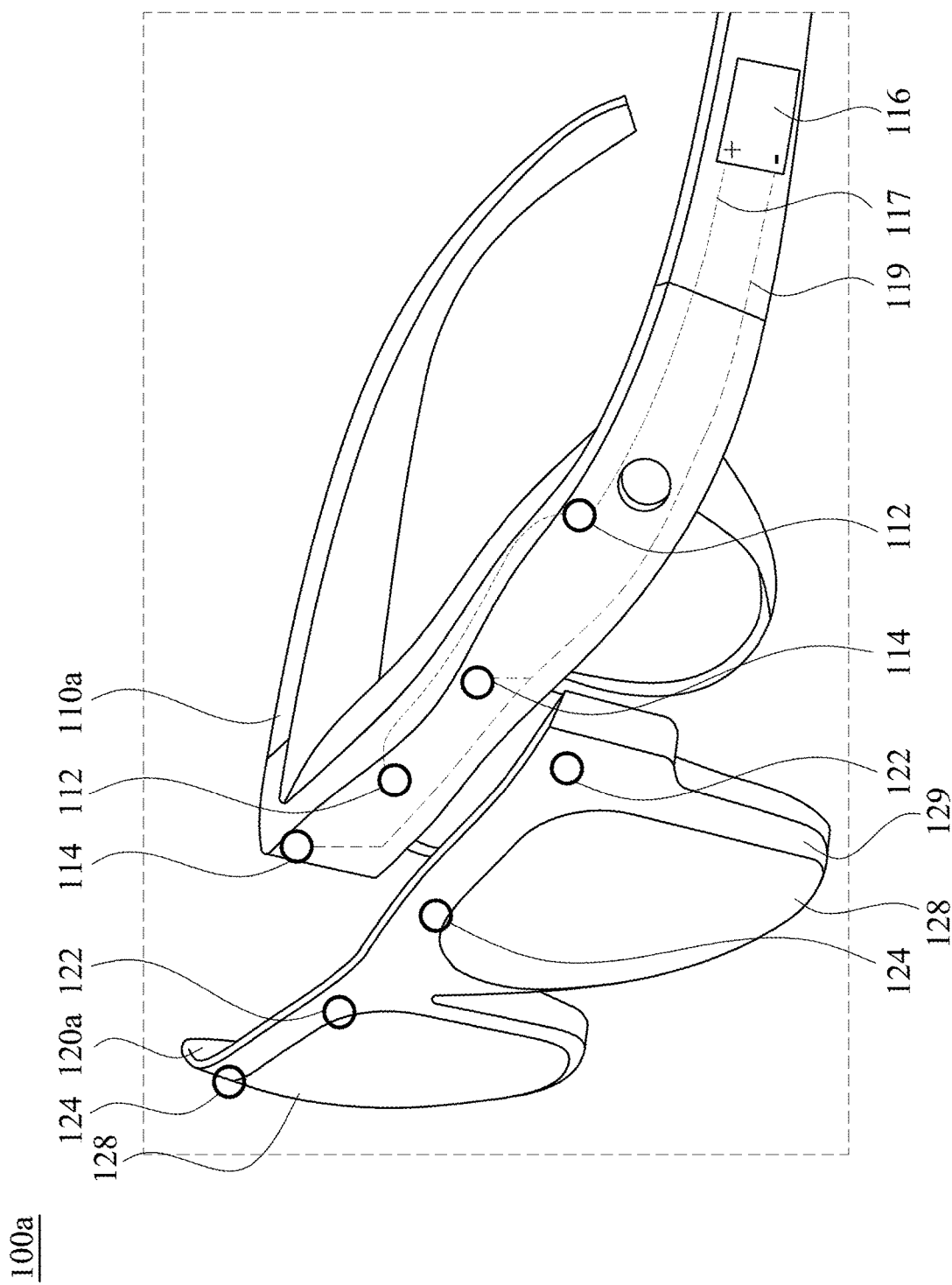
FIG. 2 is a stereogram of an augmented reality display device according to another embodiment of the present disclosure.

FIG. 2 is a stereogram of an augmented reality display device 100a according to another embodiment of the present disclosure. Refer to FIG. 2, the difference between the embodiment of FIG. 2 and the embodiment of FIG. 1 is that, in the present embodiment, one of the two third electrodes 122 (such as the third electrode 122 located at the lower-right) and one of the two fourth electrodes 124 (such as the fourth electrode 124 located at the upper-left) are located at two opposite edges of the solar charging plate 120a, one of the two first electrodes 112 (such as the first electrode 112 located at the lower-right) and one of the two second electrodes 114 (such as the second electrode 114 located at the upper-left) are located at two opposite edges of the eyeglass frame 110a. The difference of the location of the electrodes doesn't affect the implementation of the disclosure only if a third electrode 122 and a fourth electrode 124 are located at two sides of each of the lens 128 of the solar charging plate 120a, and a first electrode 112 is disposed on the position corresponds to the third electrode 122 on the eyeglass frame 110a, and a second electrode 114 is disposed on the position corresponds to the fourth electrode 124 on the eyeglass frame 110a, such that the third electrode 122 can magnetically attach and electrically connect the first electrode 112, and the fourth electrode 124 can magnetically attach and electrically connect the second electrode 114.

Figure 3:
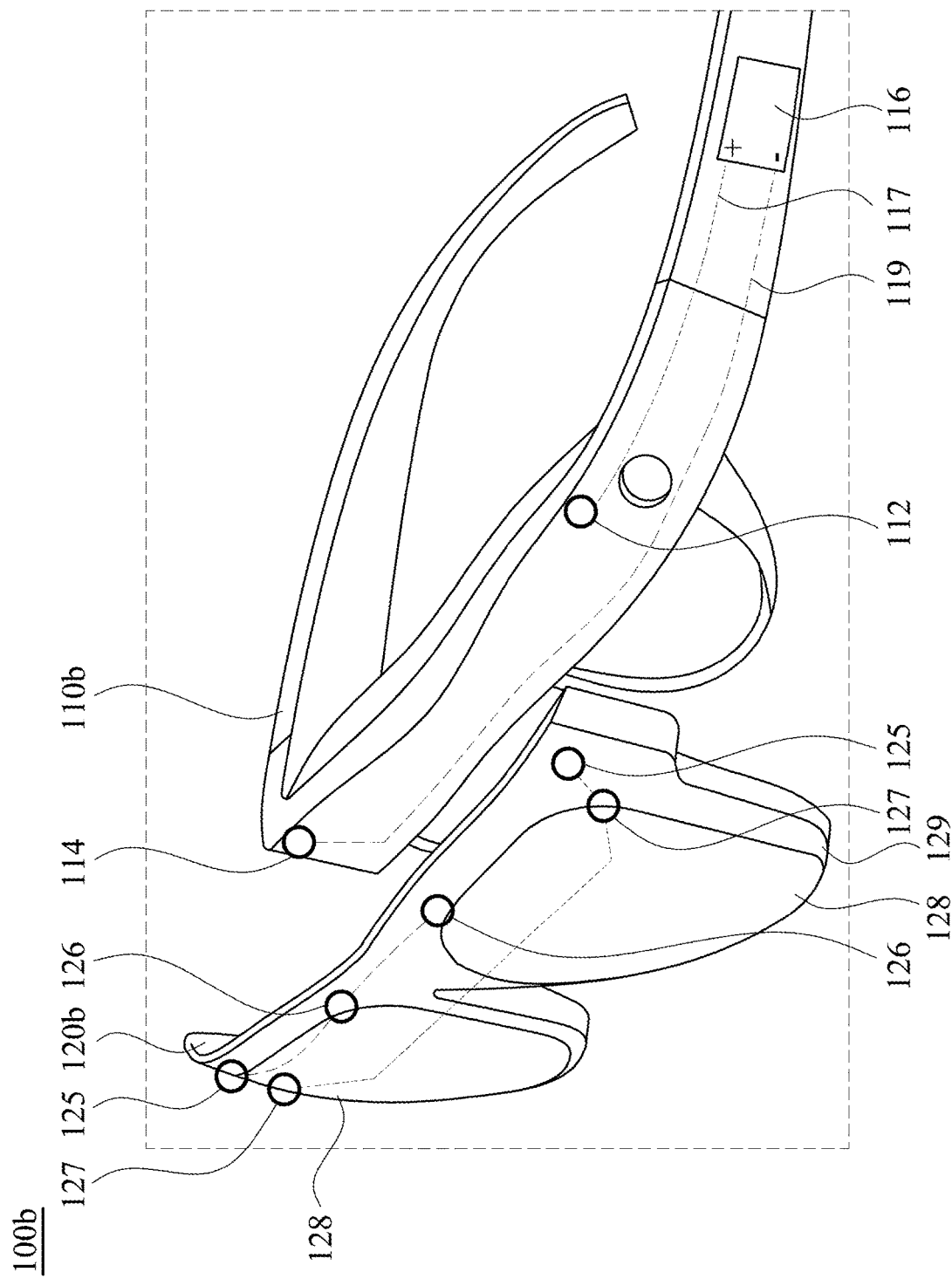
FIG. 3 is a stereogram of an augmented reality display device according to yet another embodiment of the present disclosure.

FIG. 3 is a stereogram of an augmented reality display device 100b according to yet another embodiment of the present disclosure. The augmented reality display device 100b includes an eyeglass frame 110b and a solar charging plate 120b. The solar charging plate 120b has third electrodes 127 and fourth electrodes 126. The difference between the embodiment of FIG. 3 and the embodiment of FIG. 1 is that, in the present embodiment, the third electrodes 127 and the fourth electrodes 126 don't have the function of generating magnetic field, and the solar charging plate 120b has two magnetic points 125. The magnetic field is generated by the two magnetic points 125 located at two opposite sides of the solar charging plate 120b. Furthermore, the eyeglass frame has only a first electrode 112 and a second electrode 114 respectively. One of the two magnetic points 125 electrically connects the third electrodes 127, the other of the two magnetic points 125 electrically connects the fourth electrode 126. In the present embodiment, an amount of the third electrodes 127 is two, an amount of the fourth electrodes 126 is two, and the third electrodes 127 are located at two opposite sides of the solar charging plate 120b. There are two functions of the magnetic points 125, the magnetic points 125 can attach the solar charging plate 120b to the eyeglass frame 110b, and can also provide magnetic field to charge the battery 116 in the eyeglass frame 110b.

Figure 4:
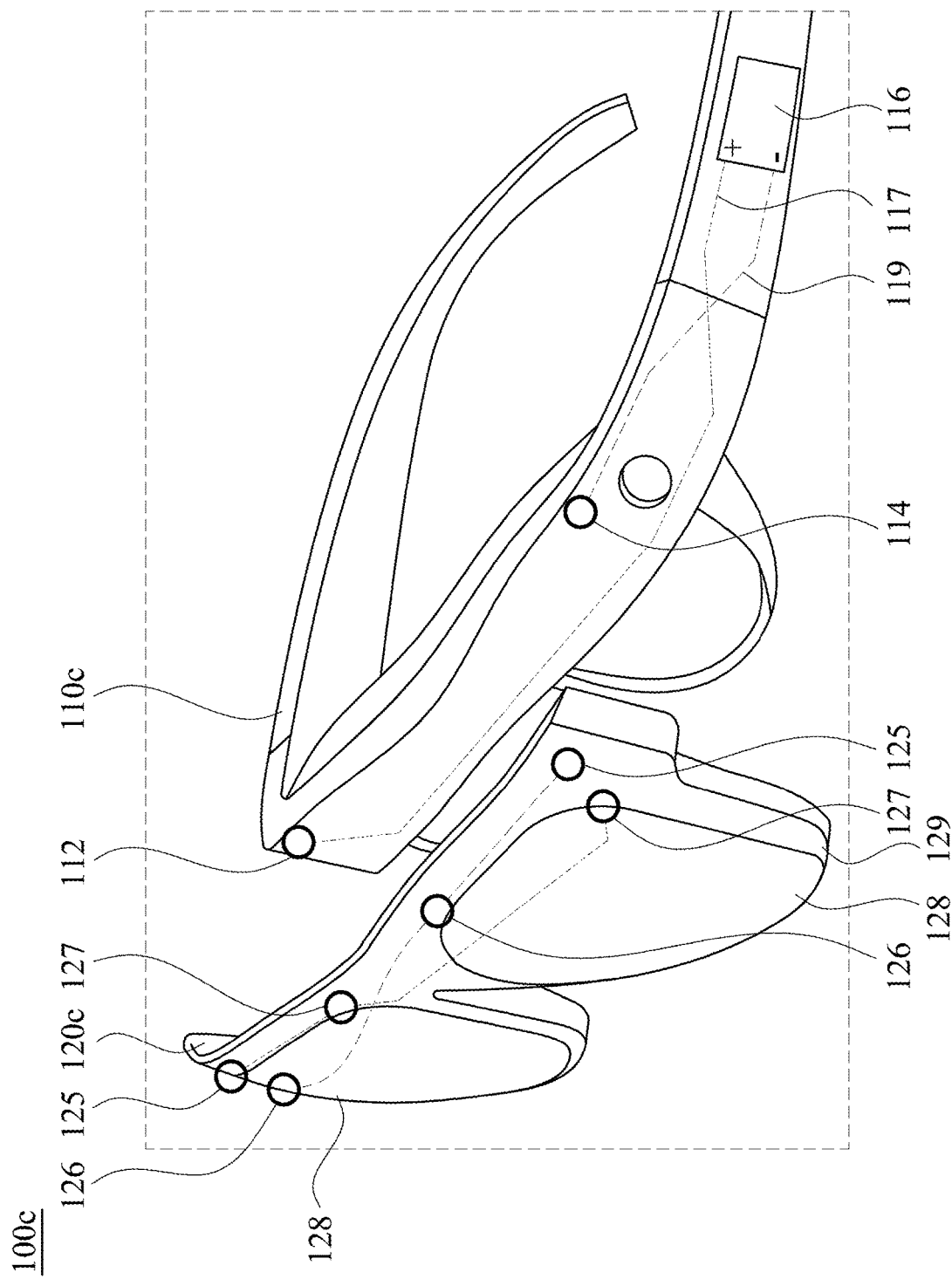
FIG. 4 is a stereogram of an augmented reality display device according to yet another embodiment of the present disclosure.

FIG. 4 is a stereogram of an augmented reality display device 100c according to yet another embodiment of the present disclosure. Refer to FIG. 4, the difference between the embodiment of FIG. 4 and the embodiment of FIG. 3 is that, in the present embodiment, one of the third electrodes 127 and one of the fourth electrodes 126 are located at two opposite sides of the solar charging plate 120c. In FIG. 4, the position of the first electrode 112 and the second electrode 114 on the eyeglass frame 110c is opposite to the position in FIG. 3. However, in real applications, the positions of the first electrode 112 and the second electrode 114 doesn't affect the implementation of the disclosure only if the first electrode 112 electrically connects the third electrodes 127 and the second electrode 114 electrically connects the fourth electrodes 126. The difference of the location of the third electrodes 127 and the fourth electrodes 126 doesn't affect the implementation of the disclosure only if a third electrode 127 and a fourth electrode 126 are located at two opposite sides of each of the lens 128 of the solar charging plate 120c.

Figure 5:
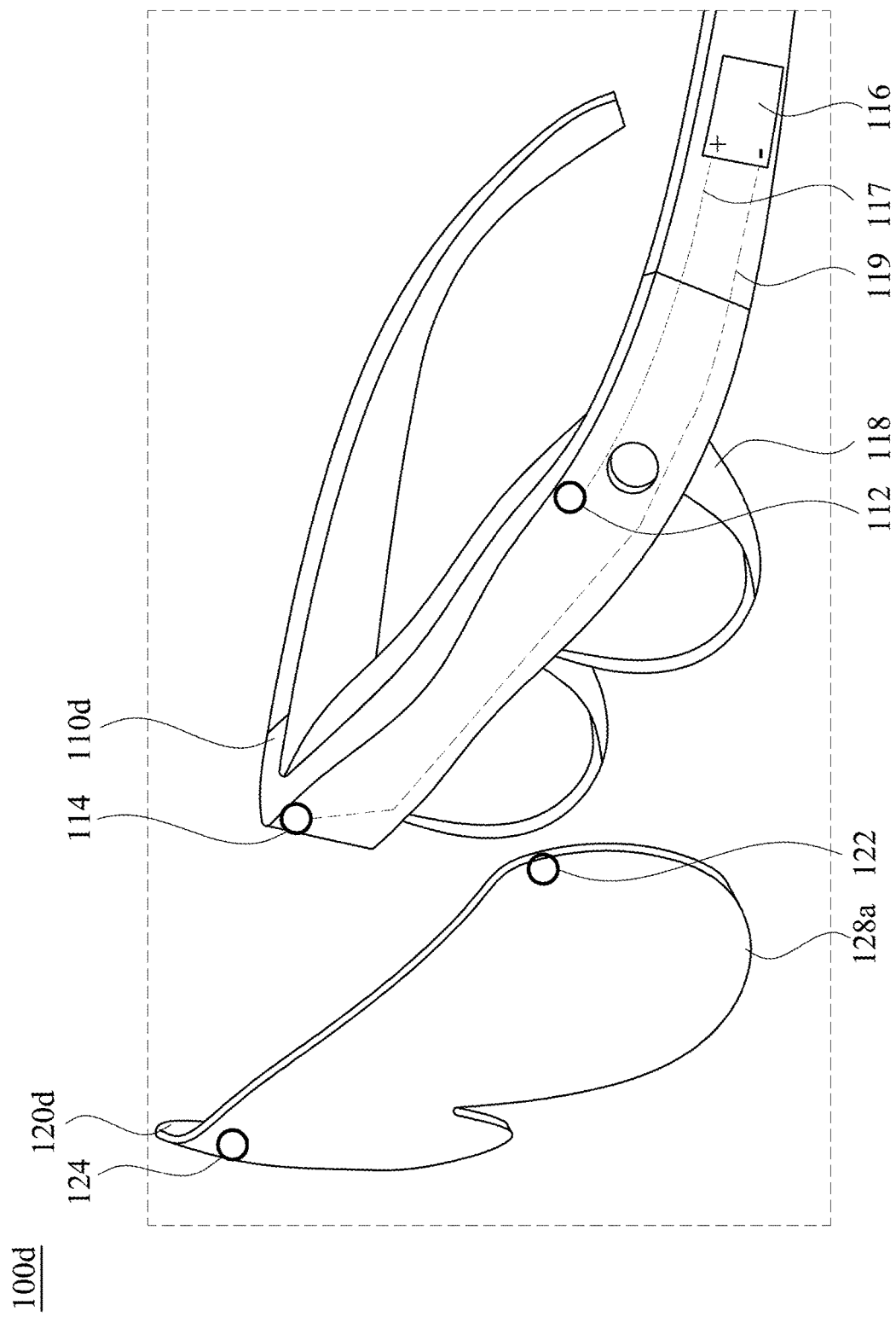
FIG. 5 is a stereogram of an augmented reality display device according to yet another embodiment of the present disclosure.

FIG. 5 is a stereogram of an augmented reality display device 100d according to yet another embodiment of the present disclosure. Refer to FIG. 5, the difference between the embodiment of FIG. 5 and the embodiment of FIG. 1 is that, in the present embodiment, the solar charging plate 120d omits the lens holder 129 and the two lenses 128 of the embodiment of FIG. 1, and has only a single lens 128a. There are one first electrode 112, one second electrode 114, one third electrode 122 and one fourth electrode 124 respectively. The first electrode 112 and the second electrode 114 are located on two opposite edges of the solar charging plate 120d respectively. The third electrode 122 and the fourth electrode 124 in the present embodiment are the same as the third electrode 122 and the fourth electrode 124 of the embodiment of FIG. 1, which can be used as an electrode and a magnetic field generating point simultaneously. Therefore, the third electrode 122 magnetically attaches and electrically connects the first electrode 112, the fourth electrode 124 magnetically attaches and electrically connects the second electrode 114.

Figure 6:
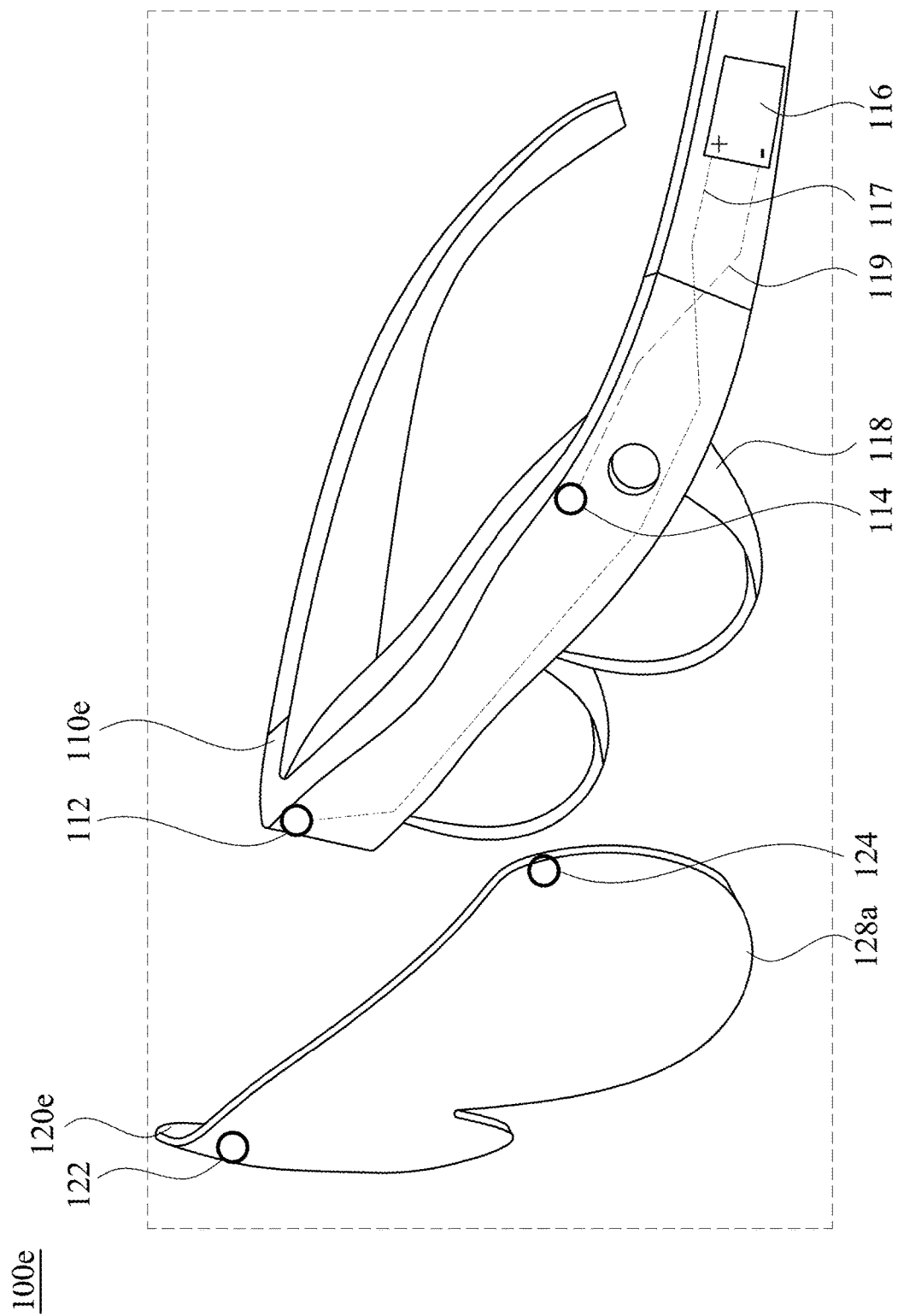
FIG. 6 is a stereogram of an augmented reality display device according to yet another embodiment of the present disclosure.

FIG. 6 is a stereogram of an augmented reality display device 100e according to yet another embodiment of the present disclosure. Refer to FIG. 6, an augmented reality display device 100e includes an eyeglass frame 110e and a solar charging plate 120e. The difference between the embodiment of FIG. 6 and the embodiment of FIG. 5 is that, in the present embodiment, the position of the third electrode 122 exchange with the position of the fourth electrode 124, and the position of the first electrode 112 exchange with the position of the second electrode 114. The position of the third electrode 122 and the fourth electrode 124 don't affect the implementation of the present disclosure only if the third electrode 122 magnetically attaches and electrically connects the first electrode 112, the fourth electrode 124 magnetically attaches and electrically connects the second electrode 114, and the third electrode 122 and the fourth electrode 124 are located at two opposite sides of the lens 128a.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An augmented reality display device, comprising:
   an eyeglass frame having at least a first electrode, at least a second electrode and a battery, wherein the first electrode and the second electrode electrically connect the battery respectively through conductive wires; and a solar charging plate detachably located on the eyeglass frame and having at least a third electrode and at least a fourth electrode, wherein the third electrode magnetically attaches and electrically connects the first electrode, the fourth electrode magnetically attaches and electrically connects the second electrode, and the solar charging plate is configured to charge the battery.

2. The augmented reality display device of claim 1, wherein the solar charging plate comprises:
a lens holder; and
two lenses fastened to the lens holder, wherein the third electrode and the fourth electrode are located on a side facing the eyeglass frame of the lens holder.

3. The augmented reality display device of claim 1, wherein the eyeglass frame further comprises:
a waveguide plate located on a surface facing away the first electrode and the second electrode of the eyeglass frame.

4. The augmented reality display device of claim 1, wherein an amount of the first electrode is two, an amount of the second electrode is two, an amount of the third electrode is two, an amount of the fourth electrode is two, the two third electrodes are located at two opposite edges of the solar charging plate, the two first electrodes are located at two opposite edges of the eyeglass frame.

5. The augmented reality display device of claim 1, wherein an amount of the first electrode is two, an amount of the second electrode is two, an amount of the third electrode is two, an amount of the fourth electrode is two, one of the two third electrodes and one of the two fourth electrodes are located at two opposite edges of the solar charging plate, one of the two first electrodes and one of the two second electrodes are located at two opposite edges of the eyeglass frame.

6. The augmented reality display device of claim 1, wherein the first electrode electrically connects a positive electrode of the battery.

7. The augmented reality display device of claim 1, wherein the second electrode electrically connects a negative electrode of the battery.

8. An augmented reality display device, comprising:
an eyeglass frame having a first electrode, a second electrode and a battery, wherein the first electrode and the second electrode electrically connect the battery respectively through conductive wires; and
a solar charging plate having at least a third electrode, at least a fourth electrode and two magnetic points, wherein one of the two magnetic points magnetically attaches and electrically connects the first electrode, the other of the two magnetic points magnetically attaches and electrically connects the second electrode, the third electrode electrically connects the first electrode, the fourth electrode electrically connects the second electrode, and the solar charging plate is configured to charge the battery.

9. The augmented reality display device of claim 8, wherein one of the two magnetic points electrically connects the third electrode, the other of the two magnetic points electrically connects the fourth electrode.

10. The augmented reality display device of claim 8, wherein the two magnetic points are located at two opposite sides of the solar charging plate.

11. The augmented reality display device of claim 8, wherein the solar charging plate comprises:
a lens holder; and
two lenses fastened to the lens holder, wherein the third electrode and the fourth electrode are located on a side facing the eyeglass frame of the lens holder.

12. The augmented reality display device of claim 8, wherein the eyeglass frame further comprises:
a waveguide plate located on a surface facing away the first electrode and the second electrode of the eyeglass frame.

13. The augmented reality display device of claim 8, wherein an amount of the third electrode is two, an amount of the fourth electrode is two, and the third electrodes are located at two opposite sides of the solar charging plate.

14. The augmented reality display device of claim 8, wherein an amount of the third electrode is two, an amount of the fourth electrode is two, and one of the third electrodes and one of the fourth electrodes are located at two opposite sides of the solar charging plate.

15. The augmented reality display device of claim 1, wherein the first electrode electrically connects a positive electrode of the battery, the second electrode electrically connects a negative electrode of the battery.

16. An augmented reality display device, comprising:
an eyeglass frame having a first electrode, a second electrode and a battery, wherein the first electrode and the second electrode electrically connect the battery respectively through conductive wires, the first electrode and the second electrode are located at two opposite sides of the eyeglass frame; and
a solar charging plate having a third electrode and a fourth electrode, wherein the third electrode magnetically attaches and electrically connects the first electrode, the fourth electrode magnetically attaches and electrically connects the second electrode, and the solar charging plate is configured to charge the battery.

17. The augmented reality display device of claim 16, wherein the third electrode and the fourth electrode are located at two opposite sides of the solar charging plate.

18. The augmented reality display device of claim 16, wherein the eyeglass frame further comprises:
a waveguide plate located on a surface facing away the first electrode and the second electrode of the eyeglass frame.

19. The augmented reality display device of claim 16, wherein the first electrode electrically connects a positive electrode of the battery.

20. The augmented reality display device of claim 16, wherein the second electrode electrically connects a negative electrode of the battery.

* * * * *